March 27, 1962 N. L. RIZER 3,026,946
SHOVEL TYPE CULTIVATOR
Filed July 22, 1960 2 Sheets-Sheet 1
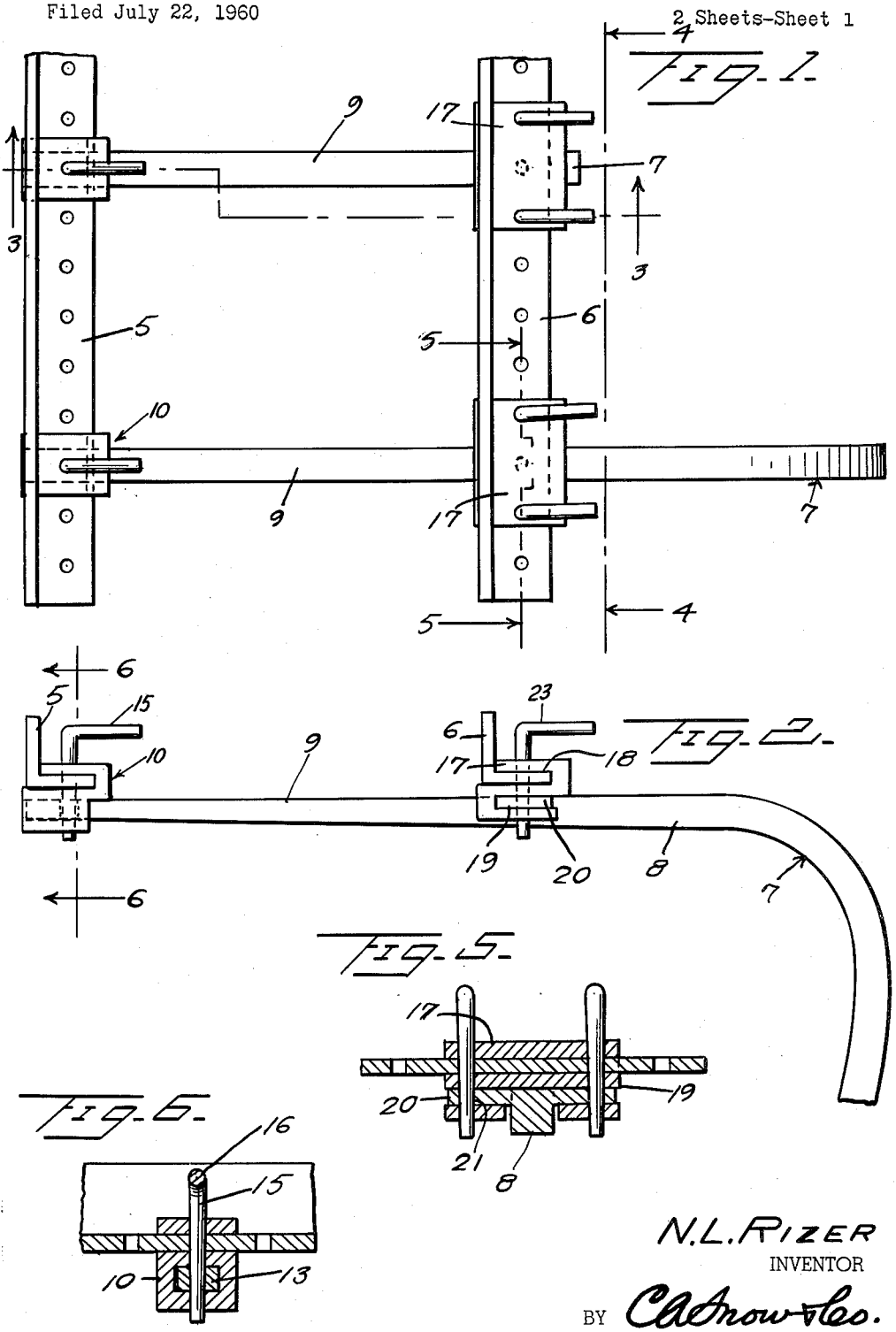
N.L. RIZER
INVENTOR
BY *Carnow & Co.*
ATTORNEYS.

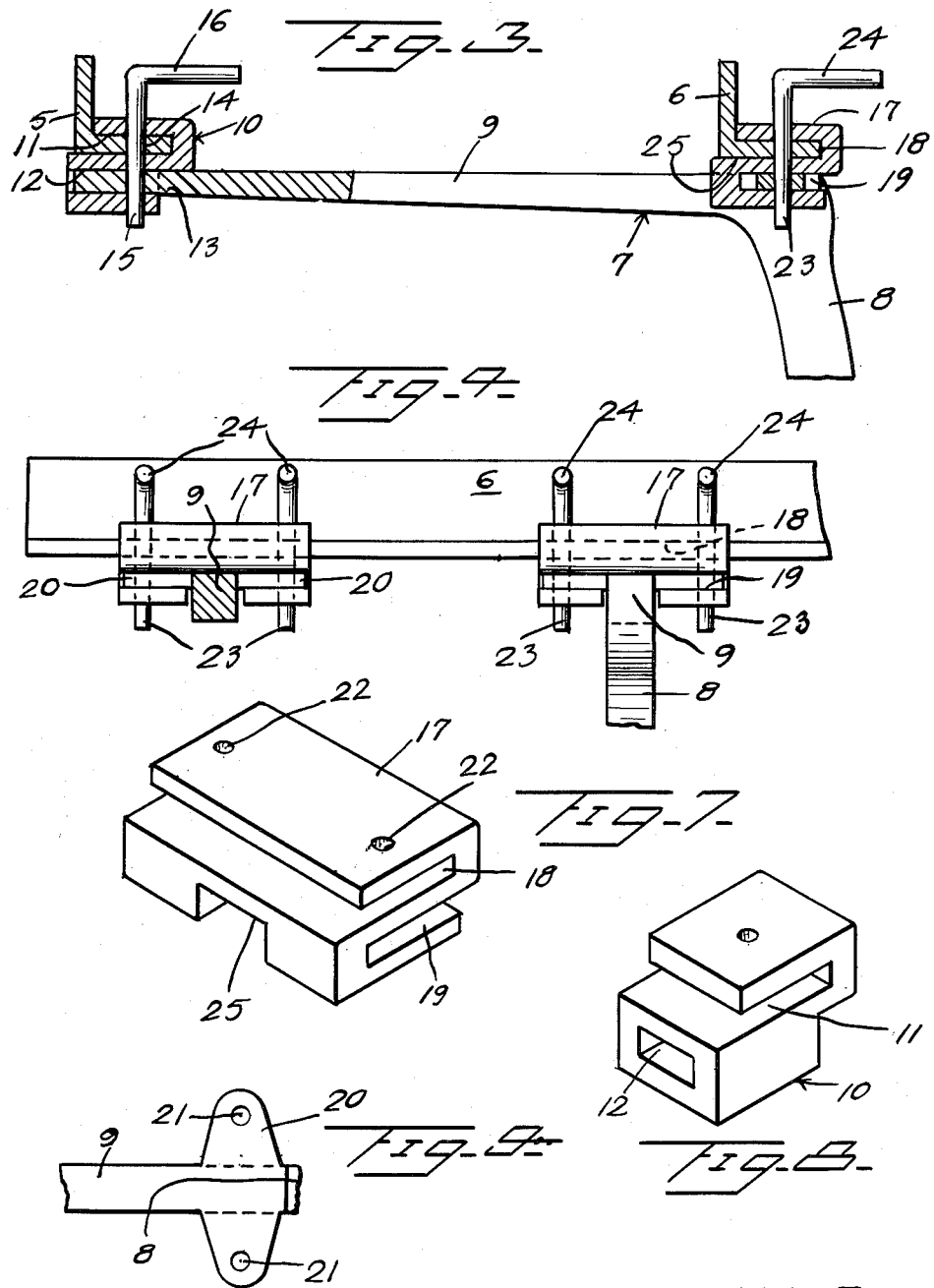

United States Patent Office 3,026,946
Patented Mar. 27, 1962

3,026,946
SHOVEL TYPE CULTIVATOR
Noble L. Rizer, Rte. 1, Quitman, Ga.
Filed July 22, 1960, Ser. No. 44,810
1 Claim. (Cl. 172—656)

This invention relates to cultivators of the removable shovel type, a primary object of the invention being to provide means for readily and easily removing and attaching cultivator shovel shanks to the spaced beams of a cultivator frame, thereby adapting the cultivator for a particular use.

An important object of the invention is to provide a shovel shank supporting bracket which may be readily secured in position on a shovel shank supporting beam of a cultivator frame by tapered securing pins, eliminating the necessity of welding the shovel shanks to the shovel supporting beams of the cultivator frame.

Another object of the invention is to provide an attaching bracket for removably securing the shanks of cultivator blades having various types of blades, to their supporting beams, by means other than threaded bolts commonly used in securing such cultivator shanks to the cultivator beams, which should they become rusted are difficult to remove without damage to the cultivator beams or shanks.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawings:

FIGURE 1 is a plan view of cultivator beams equipped with cultivator blade shanks, and secured by means of the clamp, forming the subject matter of the present invention.

FIG. 2 is an end elevational view thereof.

FIG. 3 is a sectional view taken on line 3—3 of FIG. 1.

FIG. 4 is a sectional view taken on line 4—4 of FIG. 1.

FIG. 5 is a sectional view taken on line 5—5 of FIG. 1.

FIG. 6 is a sectional view taken on line 6—6 of FIG. 2.

FIG. 7 is an enlarged perspective view of the bracket used on the rear beam of a cultivator frame.

FIG. 8 is a perspective view of the bracket used on the adjacent forward beam of the cultivator frame.

FIG. 9 is a fragmental plan view illustrating the shank of a cultivator blade provided with laterally extended ears that are gripped by the bracket.

Referring to the drawings in detail, the reference character 5 indicates a front cultivator beam while the reference character 6 indicates a rear cultivator beam, the beams 5 and 6 forming a part of the frame of a cultivator.

These beams 5 and 6, as better shown by FIG. 2 of the drawings, are of angle bar construction, the open sides of the angle bar construction or cultivator beams, being disposed rearwardly.

A cultivator blade shank is indicated generally by the reference character 7, and includes a shank 8 and a horizontal extension arm 9 which is of a length to extend across the space between the front cultivator beam and rear cultivator beam, as better shown by FIG. 3 of the drawings.

The reference character 10 indicates the front clamp of the cultivator shank securing device, the clamp being constructed of substantially wide metal and formed with a slot 11 adapted to fit over the lower flange of the front beam 5, as shown by FIG. 3 of the drawings. The lower portion of the clamp 10 is formed with an opening 12 extending therethrough, in which the forward end 13 of the arm 9 is extended.

The front clamp is provided with a pair of aligning openings, which openings are so arranged that when the front clamp is positioned over the forward beam 5 of the cultivator frame, an opening will register with an opening 14 of the front cultivator beam, which registering openings accommodate the tapered pin 15 which has an arm 16 extending laterally therefrom, for effecting movement of the tapered pin in removing or positioning the pin.

While the clamp 10 secures the forward end of the arm 9 to the front beam of the cultivator frame, the cultivator blade shank is secured to the rear beam 6 of the cultivator frame by means of the clamp 17, which clamp is also made of heavy metal and provided with a slot 18 adapted to fit over the lower flange of the rear angle beam 6 of the cultivator frame, as shown by FIG. 3 of the drawings. The clamp 17 is also formed with a slot 19 which has its open side disposed in the direction opposite to the slot 18, so that the ears 20 which extend laterally from the upper end of the shank 8, may be extended thereto. The ears 20 are formed with openings 21 that align with the openings 22 of the rear brackets, so that the aligning openings may receive the tapered pins 23 which also have their upper ends extended laterally as at 24 providing handles for effecting operation of the pins in positioning or removing the pins.

In this form of clamp, the clamp is provided with an opening 25 disposed forwardly, which opening provides a clearance for the arm 9 which is secured to the angle bar or rear beam of the cultivator frame.

From the foregoing it will be seen that due to the construction shown and described, I have provided clamping means for clamping cultivator blade shanks to a cultivator frame, eliminating the use of the conventional threaded bolts which usually become rusted and difficult to remove without damage to the cultivator shank or cultivator beams.

It will also be noted that when using the clamps in pairs as shown and described by applicant, the cultivator shanks and their blades may be readily and easily removed to reduce the number of shanks and blades or blade shanks may be readily and easily added to the beams should it be desired to provide additional cultivator blades for accomplishing a particular work.

In view of the foregoing detailed description and showing of the drawings, it is believed that further description as to the use of the clamps for clamping cultivator blade shanks to the cultivator beams of a cultivator frame is unnecessary.

This top plate and tapered pins with certain modifications as to metal construction and design can be used on any machine or attaching equipment that a fast removal would be desirable.

Having thus described the invention, what is claimed is:

A pair of adjustable brackets for securing cultivator shanks having horizontally disposed ears, to spaced front and rear cultivator beams of angle bar construction, having spaced openings therein, comprising a front bracket secured to said front cultivator beam having an opening in which the forward end of a cultivator shank is readily positioned, a second bracket having a slot facing forwardly and having a slot facing rearwardly, said forwardly facing slot adapted to fit over said rear cultivator beam, said rearwardly facing slot adapted to receive the ears of said cultivator shank, said brackets having openings adapted to align with openings in said cultivator beams and align with an opening in said shank and said ears, and tapered pins extending through said openings for securing said cultivator shanks to said beams.

References Cited in the file of this patent

FOREIGN PATENTS 609,358    Great Britain _____ Sept. 29, 1948